(12) United States Patent
Garaschenko et al.

(10) Patent No.: US 8,842,775 B2
(45) Date of Patent: *Sep. 23, 2014

(54) SYSTEM AND METHOD FOR POWER REDUCTION IN REDUNDANT COMPONENTS

(75) Inventors: Dmitri Garaschenko, Ottawa (CA); Steven Driediger, Kanata (CA); Sandy Pearse, Ottawa (JP); Tony D'Addona, Kanata (CA); Michel Patoine, Ashton (CA)

(73) Assignee: Alcatel Lucent, Boulogne-Billancourt (FR)

( * ) Notice: Subject to any disclaimer, the term of this patent is extended or adjusted under 35 U.S.C. 154(b) by 127 days.

This patent is subject to a terminal disclaimer.

(21) Appl. No.: 13/206,151

(22) Filed: Aug. 9, 2011

(65) Prior Publication Data

US 2013/0039443 A1   Feb. 14, 2013

(51) Int. Cl.
*H04B 1/16* (2006.01)
*H04L 7/00* (2006.01)
*H04L 12/10* (2006.01)

(52) U.S. Cl.
CPC ............................... *H04L 12/10* (2013.01)
USPC ............ 375/316; 370/318; 370/319; 370/320

(58) Field of Classification Search
USPC ................................................. 370/318–320
See application file for complete search history.

(56) References Cited

U.S. PATENT DOCUMENTS

| | | | |
|---|---|---|---|
| 6,445,678 B1 * | 9/2002 | Bard | 370/219 |
| 6,957,353 B2 | 10/2005 | Bresniker et al. | |
| 7,248,560 B1 * | 7/2007 | Blankenship et al. | 370/220 |
| 2002/0165981 A1 * | 11/2002 | Basturk et al. | 709/242 |
| 2003/0046604 A1 * | 3/2003 | Lau et al. | 714/11 |
| 2003/0056138 A1 * | 3/2003 | Ren | 714/4 |
| 2003/0218982 A1 * | 11/2003 | Folkes et al. | 370/238 |
| 2004/0146062 A1 * | 7/2004 | Parikh et al. | 370/419 |
| 2004/0255202 A1 * | 12/2004 | Wong et al. | 714/43 |
| 2007/0168721 A1 * | 7/2007 | Luiro et al. | 714/15 |
| 2008/0025309 A1 * | 1/2008 | Swallow | 370/392 |
| 2008/0232264 A1 * | 9/2008 | Horovitz et al. | 370/252 |
| 2010/0050000 A1 * | 2/2010 | Odlund | 713/310 |
| 2011/0004779 A1 | 1/2011 | Karam et al. | |

FOREIGN PATENT DOCUMENTS

EP    2063583 A1 *  5/2009

OTHER PUBLICATIONS

International Search Report for PCT/CA2012/050491 dated Oct. 11, 2012.

* cited by examiner

*Primary Examiner* — Brian D Nguyen
*Assistant Examiner* — Tejis Daya
(74) *Attorney, Agent, or Firm* — Kramer Amado P.C.

(57) ABSTRACT

Various exemplary embodiments relate to a telecommunications system. The telecommunications system may include at least one actively operating component and at least one redundant component. The redundant component may include a first subcircuitry for receiving synchronization information and at least one second subcircuitry. The first subcircuitry may be activated independently of the second subcircuitry.

23 Claims, 3 Drawing Sheets

SYSTEM AND METHOD FOR POWER REDUCTION IN REDUNDANT COMPONENTS

TECHNICAL FIELD

Various exemplary embodiments disclosed herein relate generally to high reliability systems with redundant components.

BACKGROUND

Telecom systems may be designed to provide certain availability, for example "five nines" or 99.999% availability. Some telecom system components may be duplicated for redundancy, as a single component failure may result in the entire telecom system going down. Components whose failure may impact the entire telecom system include, for example, control cards, power supplies, cooling units, and uplinks. These components may be duplicated for redundancy, thus increasing the system's availability. Line cards may be used for line and link protection and may be duplicated for redundancy as well; however, failure of line cards (depending on configuration) may not impact the entire telecom system. In conventional implementations, the redundant components may consume substantially the same amount of power as actively operating components resulting in increased power consumption. Thus, there is a need to reduce power consumption while still maintaining a high level of availability.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a telecommunications component including: a first subcircuitry for receiving synchronization information; and a second subcircuitry; wherein the first subcircuitry is activated independently of the second subcircuitry.

In some embodiments, the telecommunications component further includes a digital power manager that activates the first subcircuitry and the second subcircuitry. In some embodiments, the digital power manager activates the first subcircuitry and the second subcircuitry by independently supplying power to the first subcircuitry and the second subcircuitry. In some embodiments, the first subcircuitry is activated and the second subcircuitry is deactivated. In some embodiments, the first subcircuitry receives synchronization information from at least one redundant telecommunications component. In some embodiments, the at least one redundant telecommunications component is an actively operating telecommunications component. In some embodiments, the second subcircuitry is activated intermittently to update the telecommunications component with the synchronization information. In some embodiments, the telecommunications component is at least one of a control card, switching/routing fabric, power supply, cooling unit, uplink, and line card. In some embodiments, the synchronization information is at least one of dynamic information and static information. In some embodiments, the first subcircuitry stores system restore information.

Various exemplary embodiments further relate to a telecommunications system including: at least one actively operating component; and at least one redundant component having a first subcircuitry for receiving synchronization information and at least one second subcircuitry, wherein the first subcircuitry is activated independently of the at least one second subcircuitry.

In some embodiments, the telecommunications system further includes a digital power manager that activates the first subcircuitry and the at least one second subcircuitry. In some embodiments, the digital power manager activates the first subcircuitry and the at least one second subcircuitry by independently supplying power to the first subcircuitry and the at least one second subcircuitry. In some embodiments, the first subcircuitry is activated and the at least one second subcircuitry is deactivated. In some embodiments, the first subcircuitry receives synchronization information from the at least one actively operating component. In some embodiments, the telecommunications system further includes a second redundant component, wherein the first subcircuitry receives synchronization information from the second redundant component. In some embodiments, the at least one second subcircuitry is activated intermittently to update the component with the synchronization information. In some embodiments, the synchronization information is at least one of dynamic information and static information. In some embodiments, the first subcircuitry stores system restore information.

Various exemplary embodiments further relate to a method for powering a telecommunications component including: activating a first subcircuitry for receiving synchronization information from a redundant component; independently activating at least one second subcircuitry; and performing telecommunications operations upon a failure of the redundant component.

In some embodiments, the first subcircuitry and the at least one second subcircuitry are activated with a digital power manager. In some embodiments, the digital power manager activates the first subcircuitry and the at least one second subcircuitry by independently supplying power to the first subcircuitry and the at least one second subcircuitry. In some embodiments, the method further includes independently deactivating the at least one second subcircuitry. In some embodiments, the at least one second subcircuitry is activated intermittently to update the component with the synchronization information. In some embodiments, the synchronization information is at least one of dynamic information and static information. In some embodiments, the method further includes storing system restore information in the first subcircuitry.

BRIEF DESCRIPTION OF THE DRAWINGS

In order to better understand various exemplary embodiments, reference is made to the accompanying drawings, wherein.

DETAILED DESCRIPTION

Figure 1:
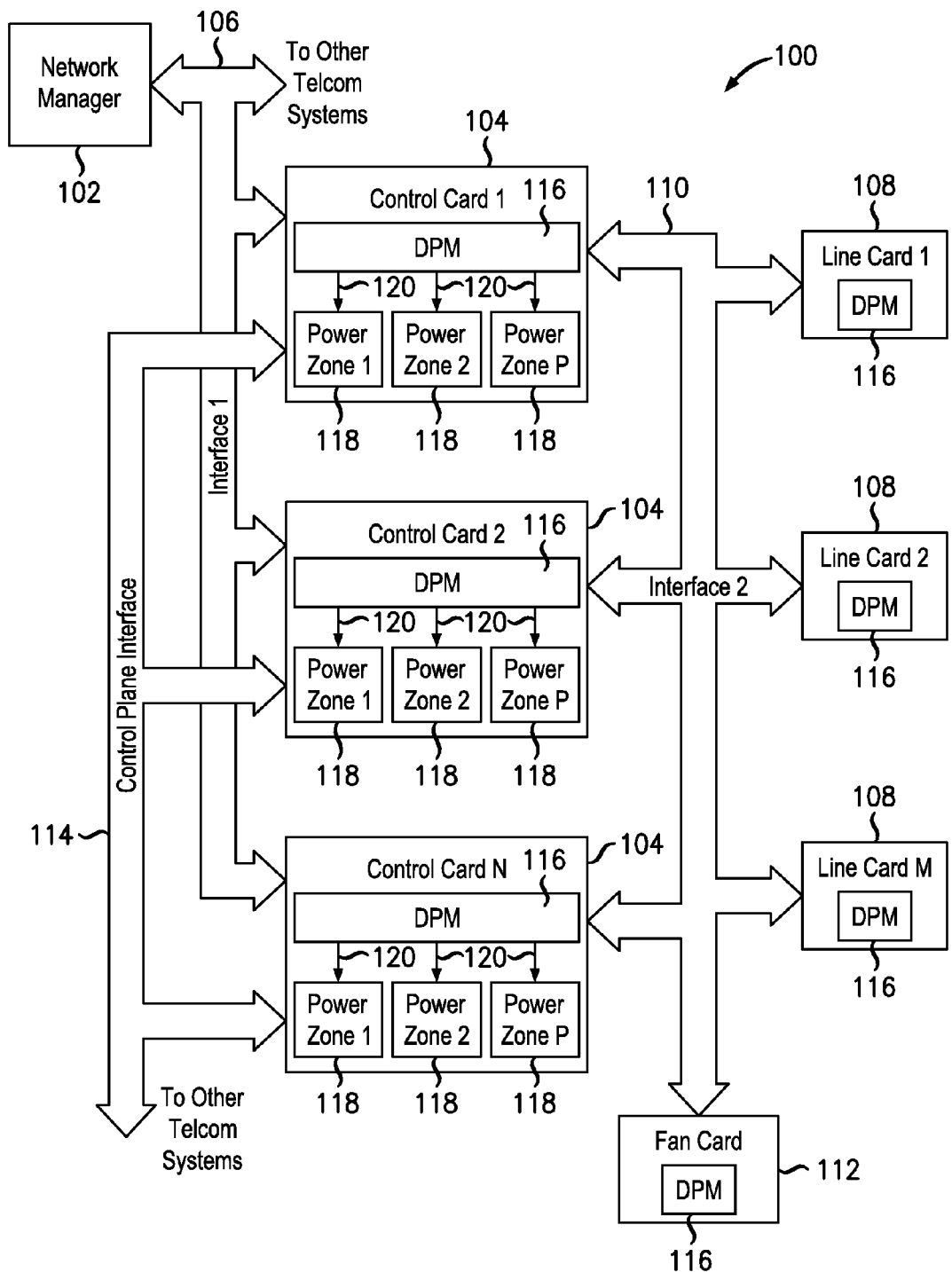
FIG. 1 illustrates an exemplary telecom system according to an embodiment of the present invention.

Referring now to the drawings, there are disclosed broad aspects of various exemplary embodiments.

Power savings in redundant control cards are described below, however the concept may be applied to other redundant components.

In conventional telecom systems, redundant control cards may assist in providing a required availability. This may be achieved by keeping all redundant control cards powered and synchronized, while only one of the control cards may be actively operating in the system. The redundant control cards may be synchronized with static and dynamic information. Static information may be information that is infrequently changed by a user configuration. Dynamic information may be information that is frequently changed by the traffic processed within the telecom system. By synchronizing the static and dynamic information among the redundant control cards, a redundant control card may quickly take over active operations if the actively operating control card fails. However, in conventional implementations, all of the redundant control cards may consume their normal power, or close to their normal power (e.g., 90%), in order to provide fast or hitless recovery. Hitless or virtually hitless is defined as redundancy which may provide protection of all telecom services; however, some packets may be dropped during switchover, as well as communication sessions which are being established and not yet synchronized with the redundant card may be dropped. In some embodiments of the present invention, a portion of the redundant control card's circuitry may be powered down, while still providing virtually hitless redundancy. Significant power savings may be realized compared to conventional implementations. Embodiments of the present invention may be combined with other power saving techniques, as described in application Ser. No. 13/206,243, "System and Method for Powering Redundant Components" and application Ser. No. 13/206,291, "System and Method for Reducing Power Consumption", incorporated by reference herein.

FIG. 1 illustrates an exemplary telecom system 100 according to an embodiment of the present invention. The telecom system 100 may include a network manager 102. The network manager 102 may manage components in the telecom system 100 and record the status of the telecom system 100. The network manager may also manage and record other telecom systems. The network manager 102 may be connected to 2-N redundant control cards 104 via a first interface 106. The first interface 106 may be, for example, an Ethernet network or other signal transmitting medium. The first interface 106 may be multiplexed onto another physical interface of the telecom system 100. The 2-N redundant control cards 104 may include two or more control cards. Each of the 2-N redundant control cards 104 may be connected to 1-M line cards 108 via a second interface 110. The second interface 110 may be, for example, an I2C bus or other signal transmitting medium. The second interface 110 may include one or more redundant interfaces. The second interface 110 may also connect each of the 2-N redundant control cards 104 to at least one fan card 112. Each of the 2-N redundant control cards 104 may be further connected to each other of the 2-N redundant control cards 104 via a control plane interface 114. The control plane interface 114 may be a shared bus, a point-to-point mesh, or other interface that allows each of the 2-N redundant control cards 104 to connect to each other of the 2-N redundant control cards 104. The control plane interface 114 may further connect the 2-N redundant control cards 104 in the telecom system 100 to other control cards in other telecom systems.

Each of the 2-N redundant control cards 104 may include a digital power manager (DPM) 116. The 1-M line cards 108 and the fan card 112 may also include DPMs 116. The DPMs 116 may be integrated into each card or provided as a separate external module connected to each card.

The DPMs 116 included in the 2-N redundant control cards 104 may activate/deactivate 1-P power zones 118 in the 2-N redundant control cards 104. Each of the 1-P power zones 118 may include subcircuitry for performing functions of the 2-N redundant control cards 104. The DPMs 116 may activate each of the 1-P power zones 118 by independently supplying power to each of the 1-P power zones 118 via activation lines 120. The DPMs 116 may also send and receive power profile information, and report power monitoring information.

Figure 2:
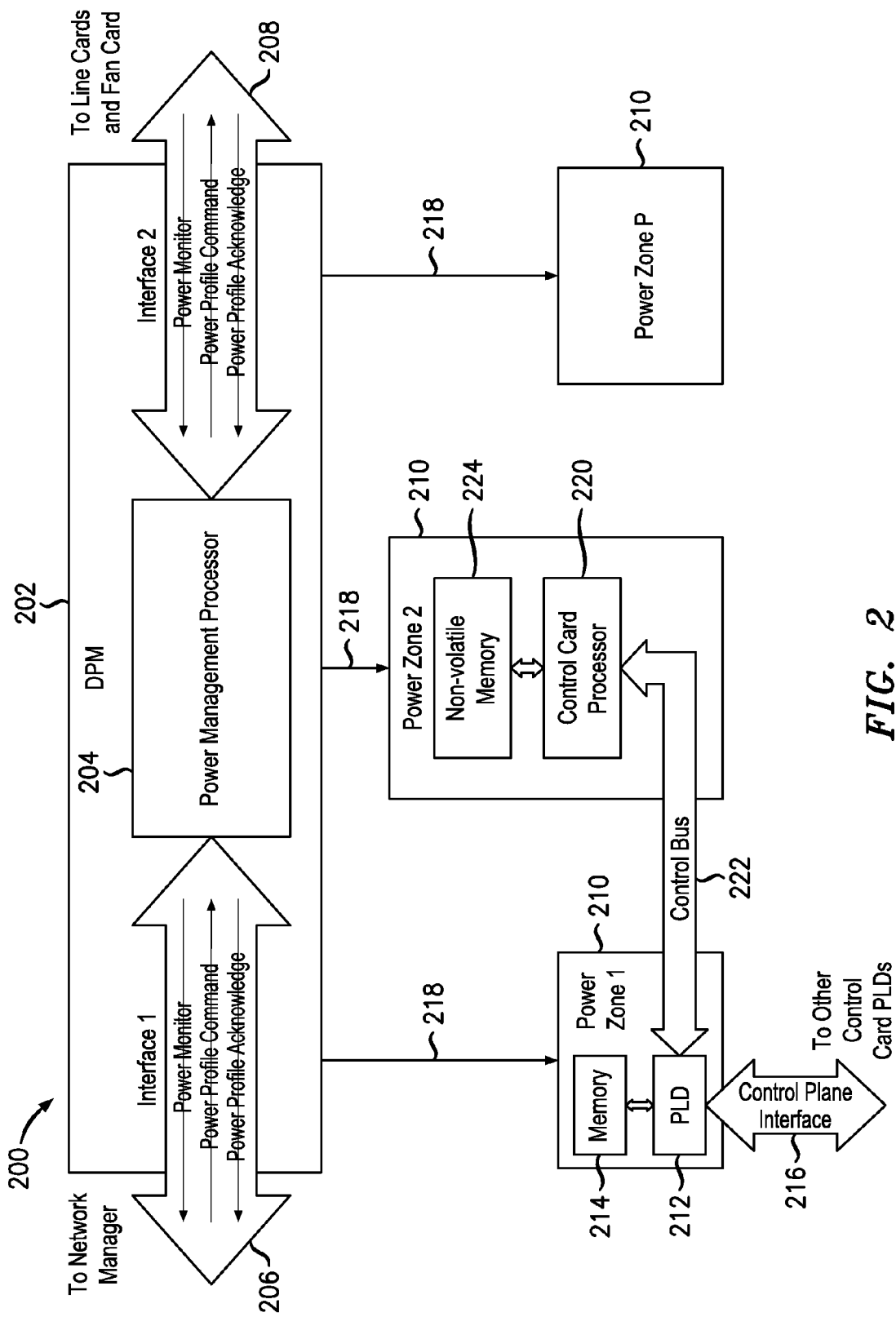
FIG. 2 illustrates an exemplary embodiment of a redundant control card according to an embodiment of the present invention.

FIG. 2 illustrates an exemplary embodiment of a redundant control card 200. The redundant control card 200 may include a DPM 202. The DPM 202 may be integrated in the redundant control card 200 or provided as a separate external module connected to the redundant control card 200. The DPM 202 may include a power management processor 204. The power management processor 204 may send and receive information from a first interface 206 and a second interface 208. The first interface 206 may be connected to the network manager 102 as illustrated in FIG. 1. The first interface 206 may be, for example, an Ethernet network or other signal transmitting medium. The second interface 208 may be connected to the line cards 108 and fan card 112 as illustrated in FIG. 1. The second interface 208 may be, for example, an I2C bus or other signal transmitting medium.

The power management processor 204 may receive power profile commands from the network manager over the first interface 206. The power profile commands may instruct the DPM 202 how to implement power distribution within the control card 200. Upon receiving and/or implementing a power profile command, the power management processor 204 may transmit a power profile acknowledge signal to the network manager over the first interface 206. The power management processor 204 may forward the power profile command, or another command in response to the power profile command, over the second interface 208 to other DPMs connected to the line cards and fan card. The power management processor 204 may receive power profile acknowledge signals over the second interface 208 from the other DPMs connected to the line cards and fan card. The power management processor 204 may forward the power profile acknowledge signals received from the other DPMs to the network manager over the first interface 206. The power management processor 204 may also transmit power monitor information to the network manager over the first interface 206. The processor 204 may also receive power monitor information from other DPMs in the telecom system over the second interface 208. The processor 204 may use the power monitor information to modify the power profile implemented by the DPM 202. In addition or alternatively, the processor 204 may forward the power monitor information received from other DPMs to the network manager.

The DPM 202 may implement a power profile based upon the power profile command received from the network manager. The power profile may instruct the DPM 202 to achieve certain desired power usage metrics. The DPM 202 may then achieve the desired power usage by activating/deactivating 1-P power zones 210 of the redundant control card 200.

Alternatively, the power profile may provide specific direction to the DPM 202 to activate/deactivate the 1-P power zones 210, instead of the DPM 202 itself deciding which zones to activate/deactivate. Each of the 1-P power zones 210 may include subcircuitry for performing functions of the redundant control card 200. The DPM 202 may activate each of the 1-P power zones 210 by independently supplying power to each of the 1-P power zones 210 via activation lines 218. At least one power zone 210 may be constantly activated. The constantly activated power zone may include a programmable logic device (PLD) 212 and a memory 214. The PLD 212 may communicate via a control plane interface 216 with at least one other PLD contained in at least one other redundant control card or actively operating control card. The control plane interface 216 may allow the actively operating control card's synchronization information to be propagated to each of the redundant control cards.

The PLD 212 may receive synchronization information from the other redundant control card or the actively operating control card. The synchronization information may be static and/or dynamic information. Static information may be information that does not change frequently. Dynamic information may be information that changes frequently. Static and/or dynamic information may include, for example, routing table information and L1, L2, and L3 level protocol information. The PLD 212 may store the synchronization information in the memory 214. The memory 214 may be internal or external to the control card. External memory may be located on another card in the telecom system, and may be visible to the PLDs of the redundant control cards and the actively operating control card.

The PLD 212 may receive the dynamic information at predetermined intervals, upon any change in the dynamic information, and/or after the actively operating control card has accumulated a predetermined number of updates to the dynamic information. The PLD 212 may receive static information at predetermined intervals, after a predetermined number of static information updates have been accumulated, and/or at any time the static information in the actively operating control card changes. By allowing longer intervals between the PLD receiving synchronization information, less power may be needed. However, longer intervals may increase the likelihood that static and/or dynamic information may be lost due to a control card failure. The interval between updates may be customized based on the type of information being synchronized.

The memory 214 accessed by the PLD 212 may store a queue of updates to the static and/or dynamic information, which may be subsequently transferred to a non-volatile memory 224 by the control card processor 220. The control card processor 220 may then periodically process the synchronization information in the non-volatile memory 224. Alternatively, the synchronization information stored in the memory 214 may be processed directly by the control card processor 220. The actively operating control card may also write synchronization information directly to the memory 214. In this case, the memory 214 may be a standardized database. Protection mechanisms may be required to detect and recover from potential database corruption, which may occur as the actively operating control card fails. The protection mechanism may be a double-banked database, where each bank is protected with a complete CRC or checksum. The banks may be switched periodically, either by the actively operating control card, or the redundant control card 200. Other power zones in the redundant control card 200 may be deactivated to conserve power. While deactivated, the other power zones may receive minimal power. Alternatively, the other power zones may be placed in a sleep mode, where they may consume less power than a fully-active mode. The other power zones may contain circuitry not necessary for keeping the redundant control card 200 synchronized with other control cards. The power zone that includes the control card processor 220 may be intermittently activated to receive the synchronization information stored in the memory 214 from the PLD 212 over a control bus 222. The control card processor 220 may use the synchronization information to update the configuration of the control card 200 and/or store the synchronization information in the non-volatile memory 224. The other power zones may be activated periodically to verify the redundant control card 200 is capable of operating properly.

The synchronization information may allow the redundant control card 200 to quickly take over control card functions upon a failure of at least one other control card. The redundant control card 200 may receive synchronization information from multiple control cards, and may take over control card functions if any of the multiple control cards fail. Without the synchronization information, the startup time of the redundant control card 200 may be extended. If another control card fails, the network manager may send a power profile command to the power management processor 204 causing the DPM 202 to activate the other power zones, and may bring the redundant control card 200 into fully active operation.

In addition to synchronization information, the redundant control card 200 may store system restore information to further accelerate the start-up time. The system restore information may be stored in the PLD's memory 214, the non-volatile memory 224, or other system memory. The PLD's memory 214 may be preferred because it may provide faster access time than other non-powered memory. The system restore information may include a set of device configuration registers required to restore traffic. The contents and format of the system restore information may only need to be visible to the local control card processor 220.

Figure 3:
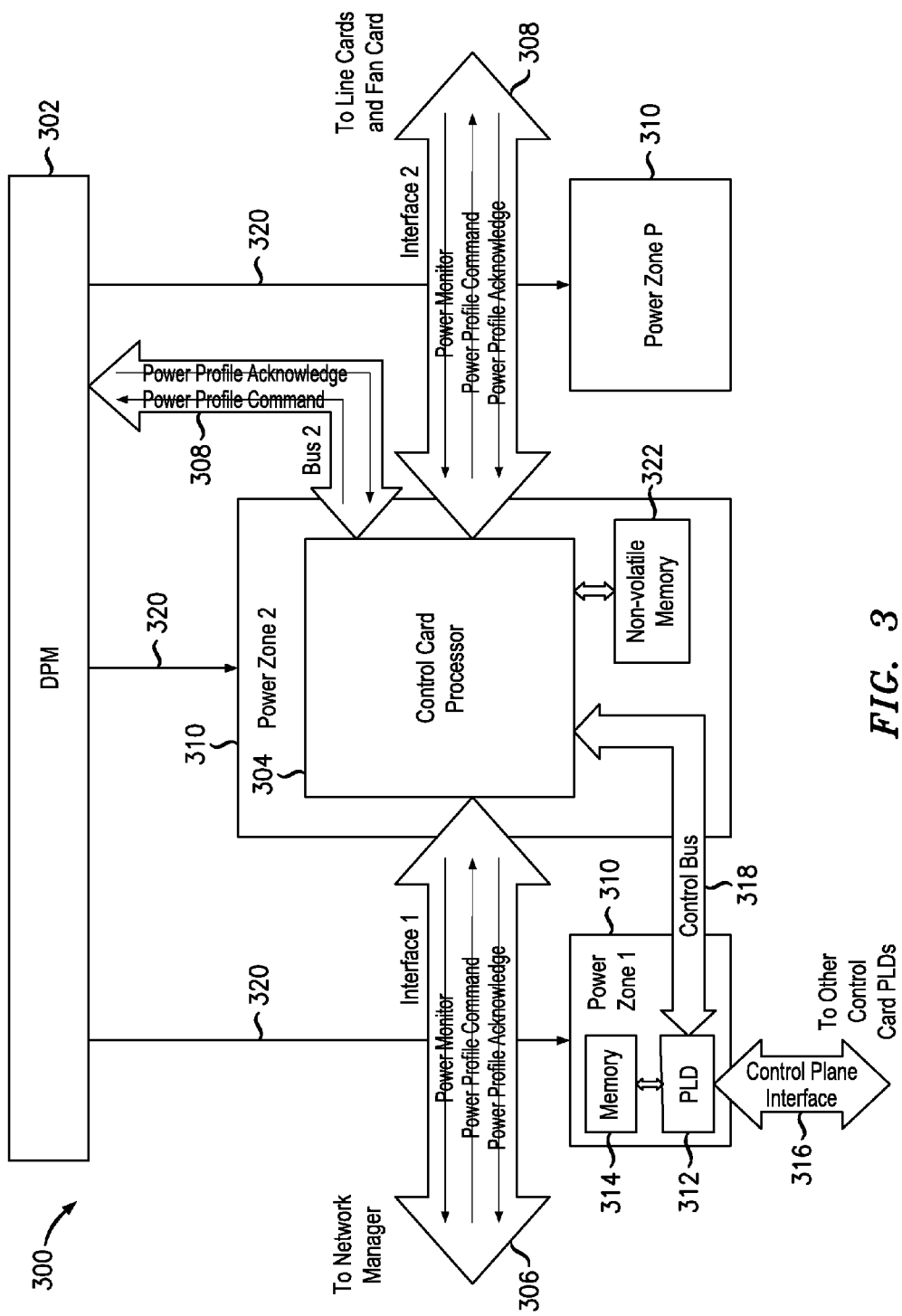
FIG. 3 illustrates an exemplary embodiment of a redundant control card according to another embodiment of the present invention.

FIG. 3 illustrates another exemplary embodiment of a redundant control card 300. The redundant control card 300 may include a DPM 302. The DPM 302 may be integrated in the redundant control card 300 or provided as a separate external module connected to the redundant control card 300. The redundant control card 300 may include 1-P power zones 310. At least one of the 1-P power zones 310 may include a control card processor 304. The control card processor 304 may send and receive information from a first interface 306 and a second interface 308. The first interface 306 may be connected to the network manager 102 as illustrated in FIG. 1. The first interface 306 may be, for example, an Ethernet network or other signal transmitting medium. The second interface 308 may be connected to the line cards 108 and fan card 112 as illustrated in FIG. 1, as well as the DPM 302. The second interface 308 may be, for example, an I2C bus or other signal transmitting medium.

The control card processor 304 may receive power profile commands from the network manager over the first interface 306. The control card processor 304 may forward the power profile command, or another command in response to the power profile command, over the second interface 308 to the DPM 302 to instruct the DPM 302 how to implement power distribution within the control card 300. Upon implementing a power profile command, the DPM 302 may transmit a power profile acknowledge signal over the second interface 308 to the control card processor 304. The control card processor 304 may pass the acknowledge signal on to the network manager over the first interface 306.

The control card processor 304 may also forward the power profile command over the second interface 308 to other DPMs connected to the line cards and fan card, and may receive power profile acknowledge signals over the second interface 308 from the other DPMs connected to the line cards and fan card. The control card processor 304 may forward the power profile acknowledge signals received from the other DPMs to the network manager over the first interface 306. The control card processor 304 may also transmit power monitor information to the network manager over the first interface 306. The control card processor 304 may also receive power monitor information from other DPMs in the telecom system over the second interface 308. The control card processor 304 may use the power monitor information to modify the power profile implemented by the DPM 302. In addition or alternatively, the control card processor 304 may forward the power monitor information received from other DPMs to the network manager.

The DPM 302 may implement a power profile based upon the power profile command received from the control card processor 304. The power profile may instruct the DPM 302 to achieve certain desired power usage metrics. The DPM 302 may then achieve the desired power usage by activating/deactivating 1-P power zones 310 of the redundant control card 300. Alternatively, the power profile may provide specific direction to the DPM 302 to activate/deactivate the 1-P power zones 310, instead of the DPM 302 itself deciding which zones to activate/deactivate. Each of the 1-P power zones 310 may include subcircuitry for performing functions of the redundant control card 300. The DPM 302 may activate each of the 1-P power zones 310 by independently supplying power to each of the 1-P power zones 310 via activation lines 320. At least one power zone 310 may be constantly activated. The constantly activated power zone may include a programmable logic device (PLD) 312 and a memory 314. The PLD 312 may communicate via a control plane interface 316 with at least one other PLD contained in at least one other redundant control card or the actively operating control card. The control plane interface 316 may allow the actively operating control card's synchronization information to be propagated to each of the redundant control cards.

The PLD 312 may receive synchronization information from the other redundant control card or the actively operating control card. The synchronization information may be static and/or dynamic information. Static information may be information that does not change frequently. Dynamic information may be information that changes frequently. Static and/or dynamic information may include, for example, routing table information and L1, L2, and L3 level protocol information. The PLD 312 may store the synchronization information in the memory 314. The memory 314 may be internal or external to the control card. External memory may be located on another card in the telecom system, and may be visible to the PLDs of the redundant control cards and the actively operating control card.

The PLD 312 may receive the dynamic information at predetermined intervals, upon any change in the dynamic information, and/or after the actively operating control card has accumulated a predetermined number of updates to the dynamic information. The PLD 312 may receive static information at predetermined intervals, after a predetermined number of static information updates have been accumulated, and/or at any time the static information in the actively operating control card changes. By allowing longer intervals between the PLD receiving synchronization information, less power may be consumed. However, longer intervals may increase the likelihood that static and/or dynamic information may be lost due to a control card failure. The interval between updates may be customized based on the type of information being synchronized.

The memory 314 accessed by the PLD 312 may store a queue of updates to the static and/or dynamic information, which may be subsequently transferred to a non-volatile memory 322 by the control card processor 304. The control card processor 304 may then periodically process the synchronization information in the non-volatile memory 322. Alternatively, the synchronization information stored in the memory 314 may be processed directly by the control card processor 304. The actively operating control card may also write synchronization information directly to the memory 314. In this case, the memory 314 may be a standardized database. Protection mechanisms may be required to detect and recover from potential database corruption, which may occur as the actively operating control card fails. The protection mechanism may be a double-banked database, where each bank is protected with a complete CRC or checksum. The banks may be switched periodically, either by the actively operating control card, or the redundant control card 300. The power zone that includes the control card processor 304 may be activated intermittently to forward power profile commands, power profile acknowledge signals, or power monitor information. The power zone that includes the control card processor 304 may also be intermittently activated to receive synchronization information stored in the memory 314 from the PLD 312 over a control bus 318. The control card processor 304 may use the synchronization information to update the configuration of the control card 300 and/or store the synchronization information in the non-volatile memory 322. Other power zones in the redundant control card 300 may be deactivated to conserve power. While deactivated, the other power zones may receive minimal power. Alternatively, the other power zones may be placed in a sleep mode, where they may consume less power than a fully-active mode. The other power zones may contain circuitry not necessary for keeping the redundant control card 300 synchronized with other control cards. The other power zones may be activated periodically to verify the redundant control card 300 is capable of operating properly.

The synchronization information may allow the redundant control card 300 to quickly take over control card functions upon a failure of at least one other control card. The redundant control card 300 may receive synchronization information from multiple control cards, and may take over control card functions if any of the multiple control cards fail. Without the synchronization information, the startup time of the redundant control card 300 may be extended. If another control card fails, the network manager may send a power profile command to the control card processor 304, causing the DPM 302 to activate other power zones, and may bring the redundant control card 300 into fully active operation.

In addition to synchronization information, the redundant control card 300 may store system restore information to further accelerate the start-up time. The system restore information may be stored in the PLD's memory 314, the non-volatile memory 322, or other system memory. The PLD's memory 314 may be preferred because it may provide faster access time than other non-powered memory. The system restore information may include a set of device configuration registers required to restore traffic. The contents and format of the system restore information may only need to be visible to the local control card processor 304.

While a control card has been used as an example embodiment, other components including, for example, switching/routing fabric, power supplies, cooling units, uplinks, line cards, etc. may be used as well. Embodiments of the present invention may be applied to various redundant components, circuitry, and systems.

It should be apparent from the foregoing description that various exemplary embodiments of the invention may be implemented in hardware and/or firmware. Furthermore, various exemplary embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A telecommunications component comprising:
    a circuit configured to provide standby redundancy to another device, the circuit comprising:
        a first subcircuitry configured to receive synchronization information,
        a second subcircuitry configured to utilize the synchronization information received by the first subcircuitry;
        wherein the first subcircuitry is activated independently of the second subcircuitry;
        a digital power manager that activates the first subcircuitry and the second subcircuitry;
    wherein the second subcircuitry is activated intermittently by the digital power manager to update the telecommunications component with the synchronization information and wherein the second subcircuitry consumes more power when activated, and
        wherein the digital power manager activates the first subcircuitry and second subcircuitry according to a received power profile.

2. The telecommunications component of claim 1, wherein the digital power manager activates the first subcircuitry and the second subcircuitry by independently supplying power to the first subcircuitry and the second subcircuitry.

3. The telecommunications component of claim 1, wherein the first subcircuitry is activated and the second subcircuitry is deactivated.

4. The telecommunications component of claim 1, wherein the first subcircuitry receives synchronization information from the other device and the other device comprises at least one other telecommunications component.

5. The telecommunications component of claim 4, wherein the at least one other redundant telecommunications component is an actively operating telecommunications component.

6. The telecommunications component of claim 1, wherein the received power profile includes an instruction to achieve a desired power usage metric.

7. The telecommunications component of claim 1, wherein the telecommunications component is at least one of a control card, switching fabric, power supply, cooling unit, uplink, and line card.

8. The telecommunications component of claim 1, wherein the synchronization information is at least one of dynamic information and static information.

9. The telecommunications component of claim 1, wherein the first subcircuitry stores system restore information.

10. A telecommunications system comprising:
    at least one actively operating component;
    at least one redundant component having a first subcircuitry for receiving synchronization information and at least one second subcircuitry,
        wherein the first subcircuitry is activated independently of the at least one second subcircuitry; and
    a digital power manager that activates the first subcircuitry and the at least one second subcircuitry,
        wherein the at least one second subcircuitry is activated intermittently to update the component with the synchronization information and wherein the second subcircuitry consumes more power when activated, and
        wherein, the digital power manager activates the first subcircuitry and second subcircuitry according to a received power profile.

11. The telecommunications system of claim 10, wherein the digital power manager activates the first subcircuitry and the at least one second subcircuitry by independently supplying power to the first subcircuitry and the at least one second subcircuitry.

12. The telecommunications system of claim 10, wherein the first subcircuitry is activated and the at least one second subcircuitry is deactivated.

13. The telecommunications system of claim 10, wherein the first subcircuitry receives synchronization information from the at least one actively operating component.

14. The telecommunications system of claim 10, further comprising:
    a second redundant component,
        wherein the first subcircuitry receives synchronization information from the second redundant component.

15. The telecommunications system of claim 10, wherein the received power profile includes an instruction to achieve a desired power usage metric.

16. The telecommunications system of claim 10, wherein the synchronization information is at least one of dynamic information and static information.

17. The telecommunications system of claim 10, wherein the first subcircuitry stores system restore information.

18. A method for powering a telecommunications component, comprising:
    activating a first subcircuitry of a unit configured to provide standby redundancy to another device, wherein the first subcircuitry is configured to receive synchronization information;

independently activating at least one second subcircuitry of the unit, wherein the second subcircuitry is configured to utilize the synchronization information received by the first subcircuitry; and performing telecommunications operations upon a failure of the other device, wherein the first subcircuitry and the at least one second subcircuitry are activated with a digital power manager, and the at least one second subcircuitry is activated intermittently to update the component with the synchronization information, and the second subcircuitry consumes more power when activated, and wherein, the digital power manager activates the first subcircuitry and second subcircuitry according to a received power profile.

19. The method of claim 18, wherein the digital power manager activates the first subcircuitry and the at least one second subcircuitry by independently supplying power to the first subcircuitry and the at least one second subcircuitry.

20. The method of claim 18, further comprising:
independently deactivating the at least one second subcircuitry.

21. The method of claim 18, wherein the received power profile includes an instruction to achieve a desired power usage metric.

22. The method of claim 18, wherein the synchronization information is at least one of dynamic information and static information.

23. The method of claim 18, further comprising:
storing system restore information in the first subcircuitry.

* * * * *